(12) United States Patent
Kim et al.

(10) Patent No.: US 10,522,823 B2
(45) Date of Patent: Dec. 31, 2019

(54) CATHODE ACTIVE MATERIAL FOR LITHIUM SECONDARY BATTERY AND LITHIUM SECONDARY BATTERY COMPRISING THE SAME

(71) Applicant: ECOPRO BM CO., LTD., Cheongju-si, Chungcheongbuk-do (KR)

(72) Inventors: Jik Soo Kim, Chungcheongbuk-do (KR); Moon Ho Choi, Chungcheongbuk-do (KR); Jin Kyeong Yun, Chungcheongbuk-do (KR); Jae Yong Jung, Chungcheongbuk-do (KR); Suk Yong Jeon, Chungcheongbuk-do (KR); Jong Seung Shin, Chungcheongbuk-do (KR)

(73) Assignee: ECOPRO BM CO., LTD., Cheongju-si (KR)

(*) Notice: Subject to any disclaimer, the term of this patent is extended or adjusted under 35 U.S.C. 154(b) by 0 days.

(21) Appl. No.: 14/785,194

(22) PCT Filed: Jan. 21, 2015

(86) PCT No.: PCT/KR2015/000648
§ 371 (c)(1),
(2) Date: Aug. 29, 2016

(87) PCT Pub. No.: WO2016/052820
PCT Pub. Date: Apr. 7, 2016

(65) Prior Publication Data
US 2016/0359165 A1    Dec. 8, 2016

(30) Foreign Application Priority Data
Oct. 2, 2014    (KR) .................... 10-2014-0132750

(51) Int. Cl.
*H01M 4/36*    (2006.01)
*H01M 4/525*    (2010.01)
(Continued)

(52) U.S. Cl.
CPC .......... *H01M 4/366* (2013.01); *H01M 4/131* (2013.01); *H01M 4/136* (2013.01);
(Continued)

(58) Field of Classification Search
None
See application file for complete search history.

(56) References Cited

U.S. PATENT DOCUMENTS

| 6,040,090 A | 3/2000 | Sunagawa et al. |
| 2013/0202966 A1 | 8/2013 | Yu et al. |

(Continued)

FOREIGN PATENT DOCUMENTS

| CN | 102714311 A | 10/2012 |
| EP | 0918041 A1 | 5/1999 |

(Continued)

OTHER PUBLICATIONS

Extended European Search Report dated Mar. 2, 2017 in European Application No. 15775064.7.
(Continued)

*Primary Examiner* — Wojciech Haske
(74) *Attorney, Agent, or Firm* — Saliwanchik, Lloyd & Eisenschenk

(57) ABSTRACT

The present invention relates to an cathode active material for lithium secondary battery and a lithium secondary battery including the same, and more specifically, it relates to an anode active material for lithium secondary battery which includes a concentration gradient layer having a controlled thickness and a shell layer on the periphery of the core layer of the anode active material having a layered structure and
(Continued)

in which the lithium ion diffusion paths in the primary particles and the secondary particles are formed to exhibit directivity in a specific direction, and a lithium secondary battery including the same.

9 Claims, 5 Drawing Sheets

(51) Int. Cl.
*H01M 4/505* (2010.01)
*H01M 10/0525* (2010.01)
*H01M 4/1315* (2010.01)
*H01M 4/131* (2010.01)
*H01M 4/136* (2010.01)
*H01M 4/58* (2010.01)
*H01M 4/02* (2006.01)

(52) U.S. Cl.
CPC ......... *H01M 4/1315* (2013.01); *H01M 4/505* (2013.01); *H01M 4/525* (2013.01); *H01M 4/582* (2013.01); *H01M 4/5825* (2013.01); *H01M 10/0525* (2013.01); *H01M 2004/021* (2013.01); *H01M 2004/028* (2013.01); *H01M 2220/20* (2013.01); *H01M 2220/30* (2013.01)

(56) References Cited

U.S. PATENT DOCUMENTS

2014/0158932 A1* 6/2014 Sun ..................... H01M 4/13
252/182.1

2015/0340686 A1* 11/2015 Sun ..................... H01M 4/364
429/223

FOREIGN PATENT DOCUMENTS

| JP | 2000-227858 A | 8/2000 | |
|---|---|---|---|
| KR | 10-2005-7007548 A | 10/2003 | |
| KR | 10-2012-0004340 A | 1/2012 | |
| KR | 10-2013-0111413 A | 10/2013 | |
| KR | 10-2013-0138147 A | 12/2013 | |
| KR | 20130138073 A * | 12/2013 | ............ H01M 4/13 |
| KR | 10-2014-0092492 A | 7/2014 | |
| WO | WO-2013147537 A1 | 10/2013 | |
| WO | WO-2014104759 A1 * | 7/2014 | ............ H01M 4/364 |

OTHER PUBLICATIONS

Paulsen et al., Core-Shell Cathode Material with Size-Dependent Composition, *Electrochemical and Solid-State Letters*, Jan. 31, 2007, pp. A101-A105, The Electrochemical Society.

Myung et al., Progress in High-Capacity Core-Shell Cathode Materials for Rechargeable Lithium Batteries, The Journal of Physical Chemistry Letters, 2014, pp. 671-679, vol. 5, American Chemical Society.

Office Action dated Jan. 17, 2018 in Chinese Application No. 201580000637.3.

International Search Report in International Application No. PCT/KR2015/000648, filed Jan. 21, 2015.

\* cited by examiner (Layered Structure)

CATHODE ACTIVE MATERIAL FOR LITHIUM SECONDARY BATTERY AND LITHIUM SECONDARY BATTERY COMPRISING THE SAME

CROSS-REFERENCE TO RELATED APPLICATIONS

This application is the U.S. national stage application of International Patent Application No. PCT/KR2015/000648, filed Jan. 21, 2015, which claims priority to Korean Application No. 10-2014-0132750, filed Oct. 2, 2014, the disclosures of each of which are incorporated herein by reference in their entirety.

TECHNICAL FIELD

The present invention relates to a cathode active material for lithium secondary battery and a lithium secondary battery including the same, and more specifically, it relates to a cathode active material for lithium secondary battery which includes a concentration gradient layer having a controlled thickness and a shell layer on the periphery of the core layer of the cathode active material having a layered structure and in which the lithium ion diffusion paths in the primary particles and the secondary particles are formed to exhibit directivity in a specific direction, and a lithium secondary battery including the same.

BACKGROUND ART

Recently, interest in the energy storage technology has been increased. The effort to research and develop an electrochemical device has been gradually materialized as the application field of the energy storage technology has been expanded to a mobile phone, a camcorder, a notebook PC, and an electric vehicle. The electrochemical device is a field which attracts the most attention in this respect, and in particular, the development of a secondary battery capable of being charged and discharged is the focus of attention.

Among the secondary batteries which are currently applied, the lithium ion battery developed in the early 1990s has been widely used as a power source of portable apparatuses since it was developed in 1991 as a small battery, a light-weight battery, and a large capacity battery. The lithium secondary battery is in the spotlight due to its advantages that the operating voltage is higher and the energy density is far greater as compared to batteries of prior art, such as a Ni-MH battery, a Ni—Cd battery, and a sulfuric acid-Pb battery which use an aqueous electrolytic solution. In particular, the lithium secondary battery is mainly adopted as a medium- or large-sized battery with an energy unit of kWh or more used for electric vehicles and energy storage, and a cathode active material which has a high capacity and is usable for a long period of time is desired for this purpose.

The full-scale commercialization of large capacity secondary batteries containing manganese spinel (LMO) and olivine-based cathode materials (LFP) which exhibit excellent thermal stability is inhibited due to a low energy density thereof, and thus the application of a layered type cathode material having a high capacity is increasingly required for an improvement in battery properties. A layered type cathode material among the cathode materials for lithium secondary battery can realize the highest capacity among the materials which are currently commercialized. The use of $LiCoO_2$ that is frequently used in a small IT apparatus such as a smart phone in a medium- or large-sized battery is inhibited by the problems of safety, a low capacity, the economic efficiency due to a high cost and limited resource due to the reserves of cobalt metal of a main raw material as compared to other transition metals, the environmental regulations due to the environmental pollution, and the like. A number of researches on $LiNiO_2$ which has the same structure as $LiCoO_2$ have been carried out for the advantages that its price is relatively inexpensive and can have a high theoretical capacity of 200 mAh/g. However, $LiNiO_2$ has not been commercialized due to the problems such as poor stability and drastic deterioration in lifespan by structural instability generated when being produced.

In order to improve the disadvantages of $LiNiO_2$, a part of nickel is substituted with a transition metal element so as to slightly shift the temperature at which the heat generation starts to a higher temperature or to prevent drastic heat generation, and other measures are attempted. The material, $LiNi_{1-x}Co_xO_2$ (x=0.1 to 0.3), obtained by substituting a part of nickel with cobalt exhibits relatively excellent charge and discharge characteristics and lifespan characteristics as compared to $LiNiO_2$ but still does not exhibit sufficient lifespan performance. In addition, a number of technologies related to the composition and production of a Li—Ni—Mn-based composite oxide obtained by substituting a part of Ni with Mn which exhibits excellent thermal stability or a Li—Ni—Mn—Co-based composite oxide obtained by substituting a part of Ni with Mn and Co are known, and a new-concept cathode active material has been recently disclosed in Japanese Patent Application Laid-Open No. 2000-227858 in which not $LiNiO_2$ or $LiMnO_2$ is partially substituted with a transition metal but Mn and Ni compounds are uniformly dispersed in the atomic level to form a solid solution.

According to European Patent 0,918,041 or U.S. Pat. No. 6,040,090 on the composition of a Li—Ni—Mn—Co-based composite oxide obtained by substituting Ni with Mn and Co, $LiNi_{1-x}Co_xMn_yO_2$ (0<y≤0.3) exhibits improved lifespan performance and thermal stability as compared to an existing material composed of only Ni and Co but still has problems to be solved, such as poor thermal stability and deterioration in lifespan performance as a Ni-based material.

In order to solve this disadvantage, a patent on a lithium transition metal oxide having a concentration gradient in the metal composition is proposed in Korea Patent Application No. 10-2005-7007548.

However, by this method, a high capacity can be realized as the cathode active material is synthesized so as to have different metal compositions in the inner layer and the outer layer, but the metal composition is not continuously and gradually changed in the cathode active material thus produced. In addition, the interface between the inner layer and the outer layer may act as a resistant component to lower the output and to deteriorate the lifespan performance when the cathode active material is used for a long period of time, and a difference in concentration gradient is not substantially generated at a high temperature for heat treatment of 850° C. or higher due to the thermal diffusion of metal ions and thus the effect of performance improvement is insignificant.

Prior Art Documents

Patent Document 1: Japanese Patent Application Laid-Open No. 2000-227858
Patent Document 2: U.S. Pat. No. 6,040,090
Patent Document 3: European Patent No. 0918041

Patent Document 4: Korea Patent Application No. 10-2005-7007548

DISCLOSURE OF THE INVENTION

Technical Problem

The present invention is made in order to solve the above problem, and an object thereof is to provide a cathode active material for lithium secondary battery having a new structure in which a concentration gradient layer having a controlled thickness is formed on the periphery of a core layer having a constant concentration of transition metal of the cathode active material having a layered structure.

Another object of the present invention is to provide a lithium secondary battery including the cathode active material for lithium secondary battery of the present invention.

Technical Solution

In order to achieve the above object, the present invention provides a cathode active material for lithium secondary battery, which has a layered structure containing nickel, manganese, and cobalt, is second particles formed by aggregation of primary particles, and includes: a core layer having constant concentrations of nickel, manganese, and cobalt; a concentration gradient layer that is formed on the periphery of the core layer and has a concentration gradient of at least one of nickel, manganese, and cobalt; and a shell layer that is formed on the periphery of the concentration gradient layer and has constant concentrations of nickel, manganese, and cobalt, and in which a thickness of the concentration gradient layer is from 10 to 500 nm.

The structure of the cathode active material for lithium secondary battery according to the present invention is schematically illustrated in FIG. 1.

In the cathode active material for lithium secondary battery according to the present invention, a thickness of the shell layer is from 10 to 200 nm.

In the cathode active material for lithium secondary battery according to the present invention, a lithium ion diffusion path in the primary particles is formed in a center direction of the secondary particles.

The structures of the primary particles and secondary particles of the cathode active material for lithium secondary battery according to the present invention are illustrated as schematic diagrams in FIG. 2a and FIG. 2b, respectively. As illustrated in FIG. 2a and FIG. 2b, the lithium ion diffusion path in the primary particles of the cathode active material for lithium secondary battery according to the present invention, namely the a-axis or b-axis in the layered structure is formed in a line and exhibits directivity in the center direction of the secondary particles.

In the cathode active material for lithium secondary battery according to the present invention, an aspect ratio of the primary particles is 1 or more and a lithium ion diffusion path in the primary particles is formed in a longitudinal direction of the particles. In other words, in the cathode active material for lithium secondary battery according to the present invention, the lithium ion diffusion path is formed in the longitudinal direction, thus the lithium ion moves into the primary particles in the lateral direction having a relatively small area when the lithium ion moves into the primary particles of the cathode active material during charging and discharging, the collapse of the crystal structure due to continuous charging and discharging occurs in a relatively small area, and as a result, the structural stability is exhibited. Hence, the structural stability and stable lifespan characteristics are exhibited even in a case in which the thickness of the concentration gradient layer in the secondary particles is from 10 to 500 nm.

In the cathode active material for lithium secondary battery according to the present invention, an area occupied by primary particles having the aspect ratio of 1 or more and the lithium ion diffusion path in the particles formed in a longitudinal direction of the particles is 20% or more of a total area. In the cathode active material for lithium secondary battery according to the present invention, the aspect ratio is defined as L/W (L: length, W: width) in a case in which the particles have a rectangular shape and it is defined as $L/(W_1+W_2)/2$ in the case of having two lateral lengths of $W_1$ and $W_2$ as illustrated in FIG. 6.

In the cathode active material for lithium secondary battery according to the present invention, an area occupied by primary particles having a lithium ion diffusion path directed toward a center direction of the secondary particles is 40% or more of a total area of the particles. In the cathode active material for lithium secondary battery according to the present invention, a lithium ion diffusion path in the primary particles inclines by ±45° or less with respect to a center direction of the secondary particles. In other words, in the cathode active material for lithium secondary battery according to the present invention, although the lithium ion diffusion path in the primary particles is directed toward the center of the secondary particles, it is not mechanically arranged in the dead center direction of the secondary particles but has a degree of freedom in arrangement within ±45° in the center direction of the secondary particles.

In the cathode active material for lithium secondary battery according to the present invention, the primary particles is formed to exhibit directivity in a center direction of the entire particles, a lithium ion diffusion path in the primary particles is formed in a center direction of the entire particles, and thus a lithium ion diffusion path from a surface to a center of the secondary particles has a one-dimensional or two-dimensional tunnel structure.

Such primary particles having different aspect ratios may have a needle shape, a plate shape, a rectangular shape, a slanted rectangular shape, or a circular column shape. By such a lithium ion diffusion path, not only the conduction velocity of the lithium ion is fast and the lithium ion conductivity is high but also the crystal structure hardly collapses despite repeated charging and discharging, and thus the cycle characteristics are improved.

In addition, in the cathode active material for lithium secondary battery according to the present invention, the charge transfer resistance, diffusion, migration, and convection between the active material particles and the lithium ions or between the electrolytes are decreased by the lithium ion diffusion path formed as a one-dimensional tunnel structure of a linear path or a two-dimensional tunnel structure of a plane path, and thus the internal impedance of the battery can be significantly decreased.

In the cathode active material for lithium secondary battery according to the present invention, the secondary particles includes a core layer that is represented by the following Formula (1) and has a constant transition metal concentration; a concentration gradient layer that is formed on the periphery of the core layer and has a concentration gradient due to a continuously change in concentration of one or more transition metals; and a shell layer that is represented by the following Formula (2), is formed on the periphery of the concentration gradient layer, and has a constant transition metal concentration.

  <Formula 1>

(In Formula 1, 0.9≤x≤1.15, 0≤a≤0.10, 0≤b≤0.1, 0≤c≤0.1, 0≤y≤0.1, Me is at least one or more elements selected from the group consisting of Al, Mg, B, P, Ti, Si, Zr, Ba and any combination thereof, and X is at least one or more elements or molecules selected from the group consisting of anions of F, $BO_3$, and $PO_4$.)

  <Formula 2>

(In Formula 2, 0.9≤x≤1.15, 0≤a≤0.35, 0≤b≤0.70, 0≤c≤0.20, 0≤y≤0.1, Me is at least one or more elements selected from the group consisting of Al, Mg, B, P, Ti, Si, Zr, Ba and any combination thereof, and X is at least one or more elements or molecules selected from the group consisting of anions of F, $BO_3$, and $PO_4$.)

In the cathode active material for lithium secondary battery according to the present invention, a lithium ion diffusion path of primary particles of the concentration gradient layer is directed toward a center direction of the secondary particles.

The present invention also provides a lithium secondary battery including the cathode active material for lithium secondary battery according to the present invention.

Advantageous Effects

In the cathode active material for lithium secondary battery according to the present invention, the thickness of the concentration gradient layer is controlled and the lithium ion diffusion path in the primary particles is formed to exhibit directivity toward the center direction of the particles, thus the storage of the lithium ion into and release thereof from the primary particles are facilitated, and the capacity, output, and lifespan characteristics of the battery including the cathode active material for lithium secondary battery according to the present invention are significantly improved as a result.

MODE FOR CARRYING OUT THE INVENTION

Figure 1:
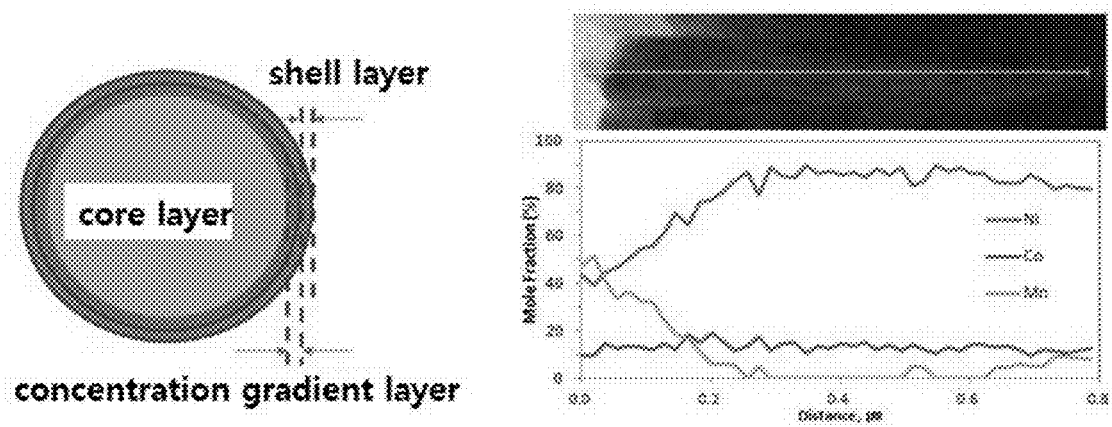
FIG. 1 schematically illustrates the structure of the cathode active material for lithium secondary battery according to the present invention.
Figure 2A:
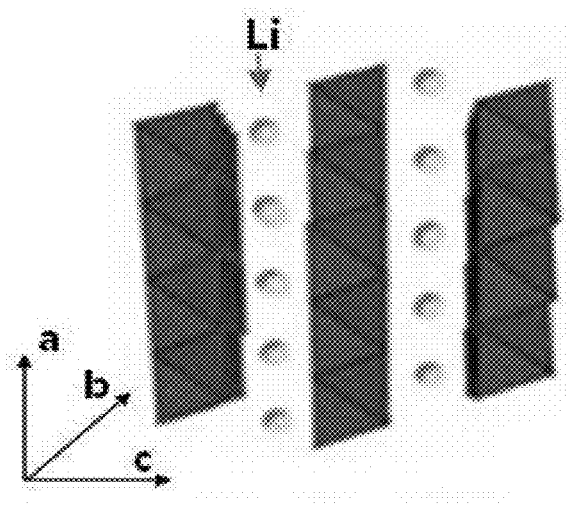
FIG. 2(a) is a schematic diagram illustrating the layered structure of the cathode active material for lithium secondary battery and FIG. 2(b) is a schematic diagram illustrating the shape of the particle cross-section and the lithium ion diffusion path of the primary particles.
Figure 2B:
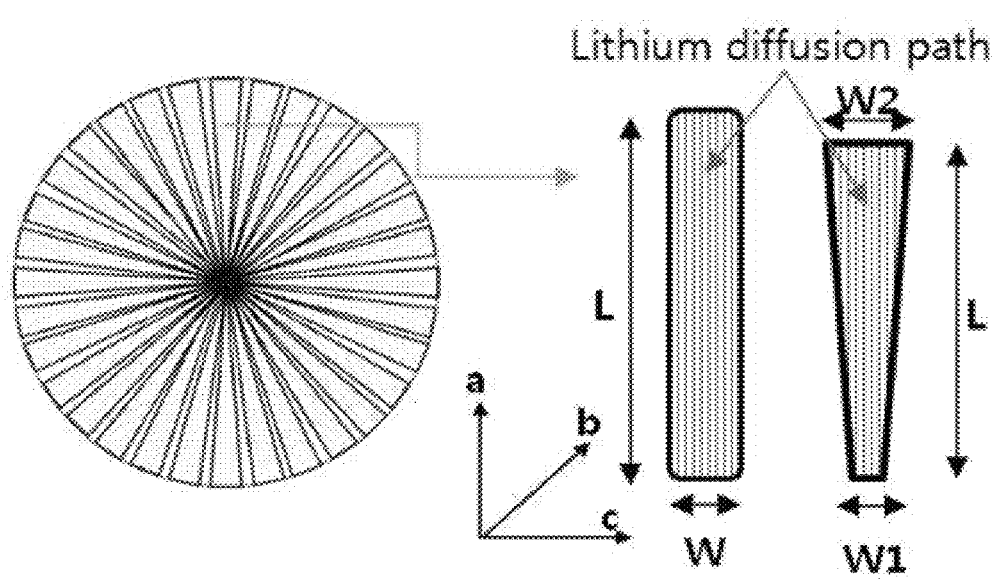

Hereinafter, the present invention will be described in more detail with reference to Examples. However, the present invention is not limited by the following Examples.

EXAMPLE 1

As the first step, 20 L of distilled water and 1000 g of ammonia as a chelating agent were introduced into a co-precipitation reactor (output of rotary motor: 80 W or more) having an internal volume of 100 L and stirred at from 300 to 1000 rpm using the impeller in the reactor while maintaining the internal temperature of the reactor at from 40 to 50° C.

As the second step, a 2.5 M aqueous solution of the first precursor prepared by mixing nickel sulfate, cobalt sulfate, and manganese sulfate at a molar ratio of 97:3:0 and a 28% aqueous ammonia solution were continuously introduced into the reactor at a rate of 2.2 L/hr and 0.15 L/hr, respectively. In addition, in order to adjust the pH, a 25% aqueous solution of sodium hydroxide was supplied thereto so that the pH was maintained at from 11.3 to 11.4. The impeller speed was adjusted to from 300 to 1000 rpm. The aqueous solution of the first precursor, ammonia, and the aqueous solution of sodium hydroxide were continuously introduced into the reactor in an amount of 27 L.

As the third step, a 2.5 M aqueous solution for forming the concentration gradient layer was prepared by mixing nickel sulfate, cobalt sulfate, and manganese sulfate at a molar ratio of 14:41:45 was introduced into a separate stirrer in which the volume of the 2.5 M aqueous solution of the first precursor prepared by mixing nickel sulfate, cobalt sulfate, and manganese sulfate at a molar ratio of 97:3:0 in the second step was fixed at 10 L other than the above reactor at a rate of 2.2 L/hr and stirred to prepare an aqueous solution of the second precursor for forming the concentration gradient layer, and the aqueous solution of the second precursor was introduced into the reactor at the same time. The aqueous solution for forming the concentration gradient layer was introduced into the batch reactor while mixing until the molar ratio of nickel sulfate, cobalt sulfate, and manganese sulfate in the aqueous solution of the second precursor became 60:20:20 of the concentration of the shell layer, the 28% aqueous ammonia solution was introduced at a rate of 0.08 L/hr, and the pH was maintained at from 11.3 to 11.4 by introducing the aqueous solution of sodium hydroxide. The amount of the aqueous solution of the second precursor, ammonia, and the aqueous solution of sodium hydroxide introduced at this time were 17 L.

Next, as the fourth step, the aqueous solution of the third precursor for forming the shell layer which was prepared by mixing nickel sulfate, cobalt sulfate, and manganese sulfate at a molar ratio of 60:20:20 was introduced into the batch reactor until the volume became 5 L, and the precipitate of spherical nickel-manganese-cobalt composite hydroxide was collected from the reactor after the reaction was terminated.

The composite metal hydroxide precipitated was filtered, washed with pure water, and then dried in a hot air dryer at 100° C. for 12 hours, thereby obtaining a precursor powder in the form of a composite metal hydroxide having a continuous concentration gradient from $(Ni_{0.97}Co_{0.03})(OH)_2$ of the core layer to $(Ni_{0.6}CO_{0.2}Mn_{0.2})(OH)_2$ of the shell layer.

EXAMPLE 2

The powder of a cathode active material was produced by the same method as in Example 1 except that the composition of the core layer was $Li(Ni_{0.97}Co_{0.03})O_2$, the composition of the shell layer was $Li(Ni_{0.5}Co_{0.2}Mn_{0.3})O_2$, and the concentration gradient layer had a continuous and constant concentration gradient from $Li(Ni_{0.97}Co_{0.03})O_2$ to $Li(Ni_{0.5}Co_{0.2}Mn_{0.3})O_2$.

EXAMPLE 3

The powder of a cathode active material was produced by the same method as in Example 1 except that the composition of the core layer was $Li(Ni_{0.97}Co_{0.03})O_2$, the composition of the shell layer was $Li(Ni_{0.4}Co_{0.2}Mn_{0.2})O_2$, and the concentration gradient layer had a continuous and constant concentration gradient from $Li(Ni_{0.97}Co_{0.03})O_2$ to $Li(Ni_{0.4}Co_{0.2}Mn_{0.2})O_2$.

EXAMPLE 4

The powder of a cathode active material was produced by the same method as in Example 1 except that the composition of the core layer was $Li(Ni_{0.90}Co_{0.10}O_2$, the composition of the shell layer was $Li(Ni_{0.5}Mn_{0.5})O_2$, and the concentration gradient layer had a continuous and constant concentration gradient from $Li(Ni_{0.90}Co_{0.10})O_2$ to $Li(Ni_{0.5}Mn_{0.5})O_2$.

EXAMPLE 5

The powder of a cathode active material was produced by the same method as in Example 1 except that the composition of the core layer was $Li(Ni_{0.90}Co_{0.10})O_2$, the composition of the shell layer was $Li(Ni_{0.35}Co_{0.15}Mn_{0.50})O_2$, and the concentration gradient layer had a continuous and constant concentration gradient from $Li(Ni_{0.90}Co_{0.10})O_2$ to $Li(Ni_{0.35}Co_{0.15}Mn_{0.50})O_2$.

EXAMPLE 6

The powder of a cathode active material was produced by the same method as in Example 1 except that the composition of the core layer was $Li(Ni_{0.90}Co_{0.03})O_2$, the composition of the shell layer was $Li(Ni_{0.30}Co_{0.10}Mn_{0.50})O_2$, and the concentration gradient layer had a continuous and constant concentration gradient from $Li(Ni_{0.90}Co_{0.10})O_2$ to $Li(Ni_{0.30}Co_{0.10}Mn_{0.50})O_2$.

COMPARATIVE EXAMPLE 1

Into a continuous reactor (100 L, CSTR reactor), 60 L of distilled water and 1000 g of ammonia as a chelating agent were introduced and stirred at from 300 to 1000 rpm using the impeller while maintaining the internal temperature of the reactor at from 40 to 50° C. In addition, nitrogen gas was continuously supplied to the reactor at a flow rate of 3 L/min. Next, a 1 M aqueous precursor solution prepared by mixing nickel sulfate, cobalt sulfate, and manganese sulfate at a molar ratio of 8:1:1 and a 28% aqueous ammonia solution were continuously introduced into the reactor at a rate of 3.25 L/hr and 0.15 L/hr, respectively. In addition, in order to adjust the pH, a 25% aqueous solution of sodium hydroxide was continuously supplied into the reactor at a rate of 0.8 L/hr so as to maintain the pH at from 11 to 12. The temperature of the reaction solution was maintained at 50±2° C.

In 13 hours after the inside of the reactor reached a steady-state, the hydroxide particles discharged from the overflow pipe were continuously collected, washed with water, dried in a hot air dryer at 100° C. for 12 hours, thereby obtaining a precursor powder in the form of a composite metal hydroxide having a composition of $(Ni_{0.8}Co_{0.1}Mn_{0.1})(OH)_2$.

The composite metal hydroxide and lithium hydroxide ($LiOH \cdot H_2O$) were mixed together at a molar ratio of 1:1.00 to 1.10, then heated at a temperature rising rate of 2° C./min, then subjected to the heat treatment at 550° C. for 10 hours, and then fired at from 700 to 1000° C. for 20 hours, thereby obtaining the powder of a cathode active material.

EXPERIMENTAL EXAMPLE

Taking of SEM Image

Figure 3:
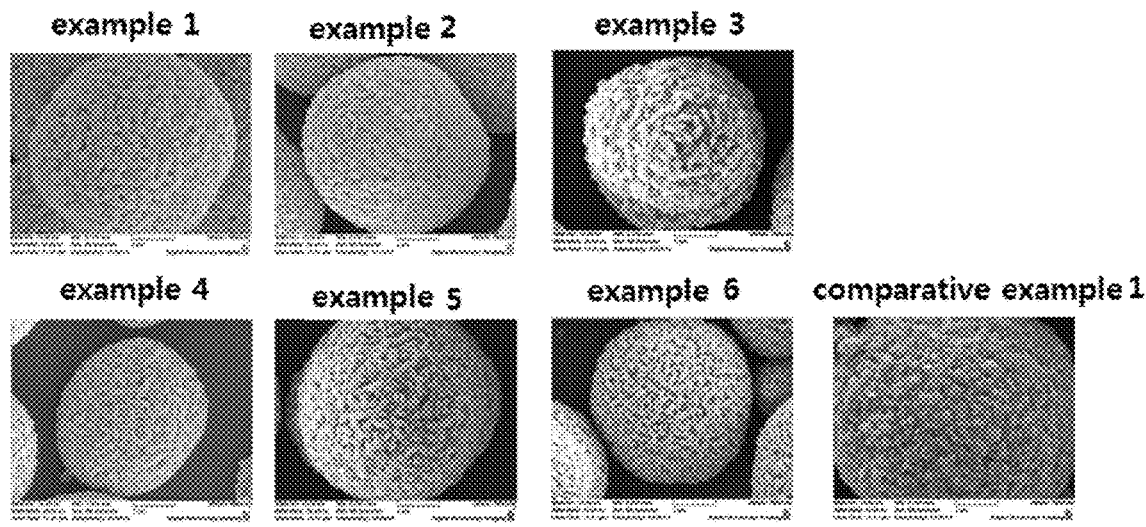
FIG. 3 and FIG. 4 illustrate SEM images of the cathode active material particles produced in Examples 1 to 6 and Comparative Example 1 of the present invention.
Figure 4:
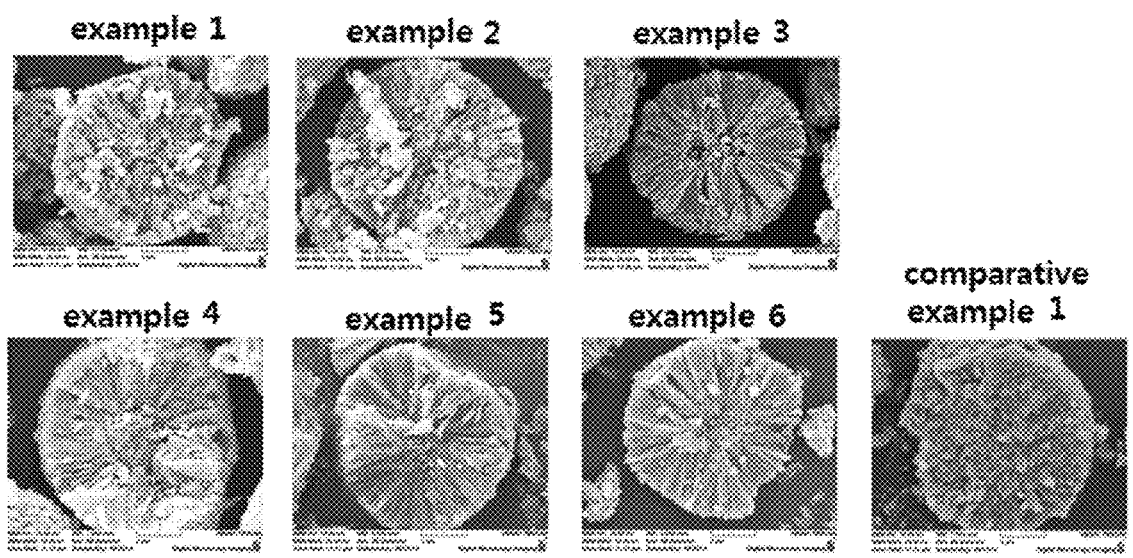

SEM images of the particles and fracture surfaces of the cathode active materials produced in Examples 1 to 6 and Comparative Example 1 were taken and the results are illustrated in FIG. 3 and FIG. 4.

From FIG. 3, it can be seen that the cathode active material particles produced in Examples 1 to 6 and Comparative Example 1 are spherical secondary particles formed by aggregation of the primary particles.

From FIG. 4 of SEM images of the fracture surfaces of the particles, it can be seen that, in the case of the particles produced in Examples 1 to 6 of the present invention, the aspect ratio of the primary particles is 1 or more, the primary particles grow in the longitudinal direction, namely the longer direction to exhibit directivity in the center direction of the particles, and thus the lithium conduction path from the surface to the center of the particles is formed as a one-dimensional or two-dimensional tunnel structure, but in the case of Comparative Example, the aspect ratio of the primary particles is much shorter than that in Examples, the particles are randomly formed, and thus directivity of the primary particles is not observed in the inside of the secondary particles.

EXPERIMENTAL EXAMPLE

Taking of TEM Image

Figure 5:
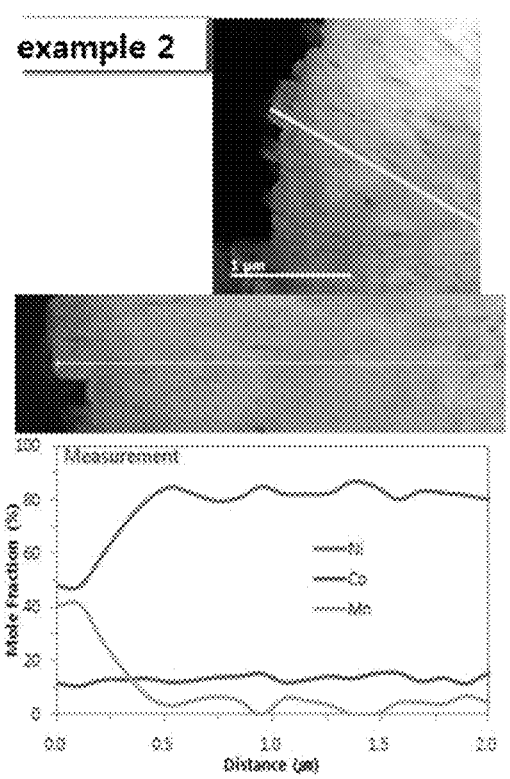
FIG. 5 and FIG. 6 illustrate the results of the internal structure and internal composition of the particles produced in Examples of the present invention measured by TEM and EDX.
Figure 5:
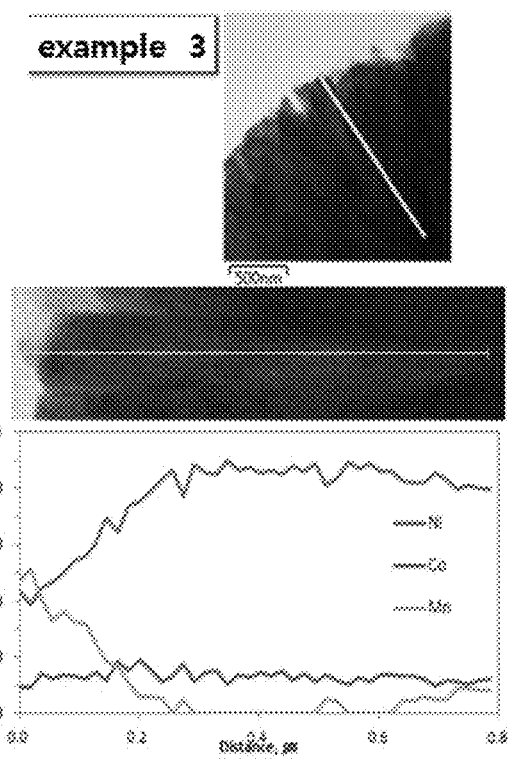
Figure 6:
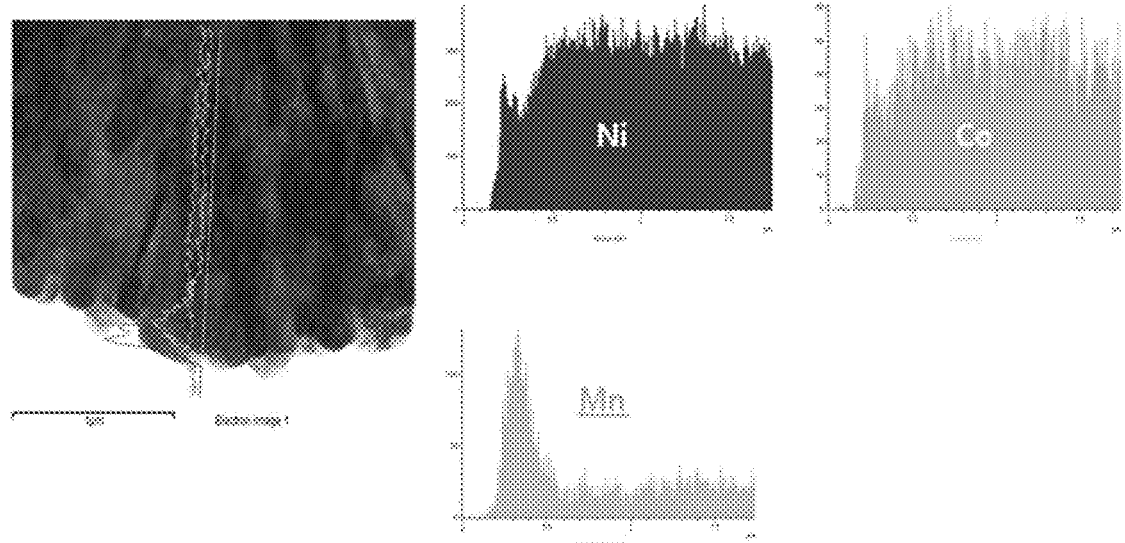

The shape and structure of the primary particles and the concentration of transition metal in the particles of Examples 2 and 3 were determined by TEM and EDX, and the results are illustrated in FIG. 5 and FIG. 6, respectively.

From FIG. 5, it can be confirmed that a concentration gradient layer and a shell layer are formed on the surface of the core layer of the particles produced in Examples 2 and 3 of the present invention, the primary particles are formed to exhibit directivity toward the center of the secondary particles, and the lithium ion conduction path in the primary particles is formed to be parallel to the center direction of the secondary particles.

On the other hand, as illustrated in FIG. 4, it can be confirmed that the lithium ion conduction path is randomly formed without exhibiting directivity in the case of the particles produced in Comparative Example 1.

EXPERIMENTAL EXAMPLE

Measurement of Properties of Particle

The composition and particle size distribution of the lithium-metal composite oxide produced in Examples 1 to 6 and Comparative Example 1 were measured using a particle size analyzer, and the results are presented in the following Table 1.

For the composition analysis, a certain amount (about 2 g) of the lithium-metal composite oxide produced above was accurately weighed (0.1 mg unit) and then transferred to a Glass Beaker, aqua regia ($HCl:HNO_3=3:1$) was added thereto, and the lithium-metal composite oxide was completely decomposed on a hot plate.

The intensity of the standard solution (three kinds) prepared using the standard solution (Inorganic Venture, 1000 mg/kg) was measured at the specific wavelength for each element of Li/Ni/Co/Mn using an inductively coupled plasma atomic emission spectrometer (ICP-AES, Perkin-Elmer 7300) to create a standard calibration curve, the pre-treated sample solution and the reference sample were then introduced into the apparatus, the intensity of each of them was measure, the actual intensity was calculated, and the concentration of each component was calculated with respect to the calibration curve created above and normalized so that the total sum became the theoretical value, thereby analyzing the composition of the lithium-metal composite oxide.

TABLE 1

| Division | Li/M ratio | BET m2/g | Result of particle size (μm) | | |
|---|---|---|---|---|---|
| | | | D10 | D50 | D90 |
| Example 1 | 1.02 | 0.37 | 7.2 | 10.5 | 13.7 |
| Example 2 | 1.02 | 0.41 | 7.5 | 11.3 | 14.7 |
| Example 3 | 1.02 | 0.36 | 8.1 | 11.0 | 13.8 |
| Example 4 | 1.03 | 0.40 | 7.6 | 10.5 | 13.6 |
| Example 5 | 1.02 | 0.38 | 7.6 | 10.7 | 13.7 |
| Example 6 | 1.02 | 0.42 | 7.4 | 10.7 | 13.8 |
| Comparative Example 1 | 1.02 | 0.47 | 7.1 | 10.7 | 14.4 |

PRODUCTION EXAMPLE

Production of Battery

The cathode active materials produced in Examples 1 to 6 and Comparative Example 1, super-P as a conductive agent, and polyvinylidene fluoride (PVdF) as a binder were mixed together at a weight ratio of 92:5:3 to prepare a slurry. The slurry was uniformly coated on an aluminum foil having a thickness of 15 μm and vacuum-dried at 135° C. to produce a cathode for lithium secondary battery.

A coin battery was produced according to a usually known manufacturing process using the anode, a lithium foil as a counter electrode, a porous polyethylene film (Celgard 2300 manufactured by Celgard, LLC., thickness: 25 μm) as a separator, and a liquid electrolytic solution in which $LiPF_6$ was dissolved at a concentration of 1.15 M in a solvent prepared by mixing ethylene carbonate and ethylmethyl carbonate at a volume ratio of 3:7.

EXPERIMENTAL EXAMPLE

Measurement of Properties of Battery

The initial capacity, initial efficiency, rate characteristics, and lifespan characteristics of the batteries produced using the active materials produced in Examples 1 to 6 and Comparative Example were measured, and the results are presented in the following Table 2.

From Table 2 below, it can be confirmed that the properties of the batteries including the active materials produced in Examples of the present invention are more significantly improved than those of the battery including the active material produced in Comparative Example.

TABLE 2

| Division | Initial capacity (mAh/g) | | Initial efficiency Eff. | Rate characteristics (2 C/0.1 C) | Lifespan performance At 100th cycle |
|---|---|---|---|---|---|
| | Initial charge quantity | Discharge quantity | | | |
| Example 1 | 232.4 | 209.9 | 90.3% | 87.0% | 91.9% |
| Example 2 | 223.4 | 201.1 | 90.0% | 88.5% | 92.3% |
| Example 3 | 225.3 | 203.0 | 90.1% | 87.8% | 96.6% |
| Example 4 | 213.7 | 194.9 | 91.2% | 83.4% | 94.6% |
| Example 5 | 215.9 | 199.2 | 92.2% | 84.3% | 94.9% |
| Example 6 | 209.6 | 192.8 | 92.0% | 83.0% | 95.7% |
| Comparative Example 1 | 227.1 | 203.9 | 89.8% | 82.5% | 81.4% |

INDUSTRIAL APPLICABILITY

As described above, the cathode active material for lithium secondary battery according to the present invention is significantly useful in that the thickness of the concentration gradient layer is controlled and the lithium ion diffusion path in the primary particles is formed to exhibit directivity toward the center direction of the particles, thus the storage of the lithium ion into and release thereof from the primary particles are facilitated, and the capacity, output, and lifespan characteristics of the battery including the cathode active material for lithium secondary battery according to the present invention are significantly improved.

What is claimed is:

1. A cathode active material for a lithium secondary battery that has a layered structure containing nickel, manganese, and cobalt, and having secondary particles for med by aggregation of primary particles, the cathode active material comprising:
a core layer having constant concentrations of nickel, manganese, and cobalt;
a concentration gradient layer formed on a periphery of the core layer and having a concentration gradient of at least one of nickel, manganese, and cobalt; and
a shell layer formed on a periphery of the concentration gradient layer and having constant concentrations of nickel, manganese, and cobalt,
wherein the concentration gradient layer has a controlled thickness,
wherein the thickness of the concentration gradient layer is in a range from 10 nm to 500 nm,
wherein lithium ions of the primary particles diffuse in a path in a radial direction of the secondary particles, the path having a shape of a wedge having a circumferential width at one end of the radial direction greater than a circumferential width at another end of the radial direction;
wherein a thickness of the shell layer is in a range from 10 nm to 200 nm, and
wherein the core layer having constant concentrations of nickel, manganese, and cobalt is represented by following Formula 1 and the shell layer is represented by following Formula 2:

  <Formula 1>

(where in Formula 1, 0.9≤x≤1.15, 0≤a≤0.10, 0≤b≤0.1, 0≤c≤0.1, 0≤y≤0.1, 0.9≤1-a-b-c≤1.0, Me is one or more elements selected from the group consisting of Al, Mg, B, P, Ti, Si, Zr, Ba, and any combination thereof; and X is one or more elements or molecules selected from the group consisting of anions of F, BO3, and PO4) and $$Li_xNi_{1-a-b-c}Co_aMn_bMe_cO_{2-y}X_y \qquad \text{<Formula 2>}$$

(where in Formula 2, $0.9 \leq x \leq 1.15$, $0 \leq a \leq 0.35$, $0 \leq b \leq 0.70$, $0 \leq c \leq 0.20$, $0 \leq y \leq 0.1$, Me is one or more elements selected from the group consisting of Al, Mg, B, P, Ti, Si, Zr, Ba, and any combination thereof; and X is one or more elements or molecules selected from the group consisting of anions of F, BO3, and PO4).

2. The cathode active material for the lithium secondary battery according to claim 1, wherein an aspect ratio of the primary particles is equal to or greater than 1.

3. The cathode active material for the lithium secondary battery according to claim 1, wherein a surface area of the primary particles that have an aspect ratio equal to or greater than 1 and have the lithium ion diffusion path formed in the radial direction of the secondary particles is equal to or greater than 20% of a total area of surfaces of the secondary particles.

4. The cathode active material for the lithium secondary battery according to claim 1, wherein outer boundaries of the lithium ion diffusion path of the primary particles incline at angles equal to or smaller than ±45° with respect to the radial direction of the secondary particles.

5. The cathode active material for the lithium secondary battery according to claim 1, wherein a surface area of the primary particles having a lithium ion diffusion path directed toward the radial direction of the secondary particles is equal to or greater than 40% of a total area of surfaces of the secondary particles.

6. The cathode active material for the lithium secondary battery according to claim 1, wherein the primary particles are formed to exhibit directivity in the radial direction of the secondary particles, a lithium ion diffusion path of the primary particles is formed in the radial direction of the secondary particles such that the lithium ion diffusion path formed from a circumference to a center of the secondary particles has a one-dimensional or two-dimensional tunnel structure.

7. The cathode active material for the lithium secondary battery according to claim 1, wherein the lithium ion diffusion path of the primary particles of the concentration gradient layer is directed toward the radial direction of the secondary particles.

8. The cathode active material for the lithium secondary battery according to claim 1, wherein the primary particles have a needle shape, a plate shape, a rectangular shape, a slanted rectangular shape, or a circular column shape.

9. A lithium secondary battery comprising the cathode active material for the lithium secondary battery according to claim 1.

* * * * *